(12) United States Patent
Seydoux

(10) Patent No.: US 8,111,833 B2
(45) Date of Patent: Feb. 7, 2012

(54) METHOD OF REDUCING RESIDUAL ACOUSTIC ECHO AFTER ECHO SUPPRESSION IN A "HANDS FREE" DEVICE

(76) Inventor: Henri Seydoux, Paris (FR)

( * ) Notice: Subject to any disclaimer, the term of this patent is extended or adjusted under 35 U.S.C. 154(b) by 405 days.

(21) Appl. No.: 12/445,076

(22) PCT Filed: Aug. 10, 2007

(86) PCT No.: PCT/FR2007/001361
§ 371 (c)(1),
(2), (4) Date: Jul. 3, 2009

(87) PCT Pub. No.: WO2008/049982
PCT Pub. Date: May 2, 2008

(65) Prior Publication Data
US 2009/0310796 A1 Dec. 17, 2009

(30) Foreign Application Priority Data

Oct. 26, 2006 (FR) ...................................... 06 09395

(51) Int. Cl.
*G10K 11/00* (2006.01)
(52) U.S. Cl. .. 381/71.1; 700/94; 379/406.1; 379/406.16
(58) Field of Classification Search .................... 381/66, 381/83, 96, 71; 700/94; 455/569.1–570, 455/63.1; 379/406.1, 406.16, 391–392.01
See application file for complete search history.

(56) References Cited

U.S. PATENT DOCUMENTS

| | | | | |
|---|---|---|---|---|
| 5,568,558 | A * | 10/1996 | Ramm et al. | 381/94.4 |
| 5,761,318 | A * | 6/1998 | Shimauchi et al. | 381/66 |
| 6,442,275 | B1 | 8/2002 | Diethorn | |
| 6,697,486 | B1 * | 2/2004 | Takada | 379/406.01 |
| 6,757,395 | B1 * | 6/2004 | Fang et al. | 381/94.3 |
| 6,970,558 | B1 | 11/2005 | Schmidt | |
| 7,885,810 | B1 * | 2/2011 | Wang | 704/225 |
| 7,953,596 | B2 * | 5/2011 | Pinto | 704/233 |
| 2005/0129226 | A1 * | 6/2005 | Piket et al. | 379/406.01 |
| 2006/0098808 | A1 * | 5/2006 | Marchok et al. | 379/406.02 |

(Continued)

FOREIGN PATENT DOCUMENTS

| | | |
|---|---|---|
| EP | 0596623 A2 | 5/1994 |
| JP | 60-102052 A | 6/1985 |
| JP | 2-209027 A | 8/1990 |
| WO | 96/26592 A | 8/1996 |
| WO | 0025441 A1 | 5/2000 |

OTHER PUBLICATIONS

Gustafsson et al, A Psychoacoustic Approach to Combined Acoustic Echo Cancellation and Noise Reduction, IEEE,2002, pp. 245-255.*
Turbin et al, Comparison of Three Post-Filtering Algorithms for Residual Acoustic Echo Reduction,IEEE,1997,pp. 307-310.*
Martin et al,A Noise Reduction Preprocessor for Mobile Voice Communication, EURASIP,2004.*
Enzner et al, Robust and Elegant ,Purely Statistical Adaptation of Acoustic Echo Canceler and Postfilter,IWAENC 2003, Sep. 2003,pp. 43-46.*

* cited by examiner

*Primary Examiner* — Davetta W Goins
*Assistant Examiner* — Kuassi Ganmavo
(74) *Attorney, Agent, or Firm* — Haverstock & Owens LLP

(57) ABSTRACT

The method comprises, in the time domain, echo cancellation processing (40) by subtracting from the microphone signal a reference signal delivered by an adaptive circuit for modeling the acoustic coupling between the microphone (18) and the loudspeaker (16). Successive frames of the signal are subjected in the frequency domain to processing (42) for suppressing the residual echo that remains after the echo cancellation, together with noise reduction processing (44). The residual echo suppression processing comprises estimating respective values for the power of the residual echo over a plurality of defined frequency bands for successive signal frames, then calculating and applying a variable gain specific to each frequency band and to each frame, the respective gains being smaller whenever the estimated relative power of the residual echo is high for the frequency band under consideration, and vice versa. For each frequency band and for each frame, the respective values of the power of the ambient noise present in the microphone signal are estimated a priori, and the relative levels of the power of the noise and of the power of the residual echo in the microphone signal are compared. The variable gain is a function of the estimated relative power of the residual echo when its level is greater than that of the noise, and otherwise of the estimated relative power of the noise.

4 Claims, 2 Drawing Sheets

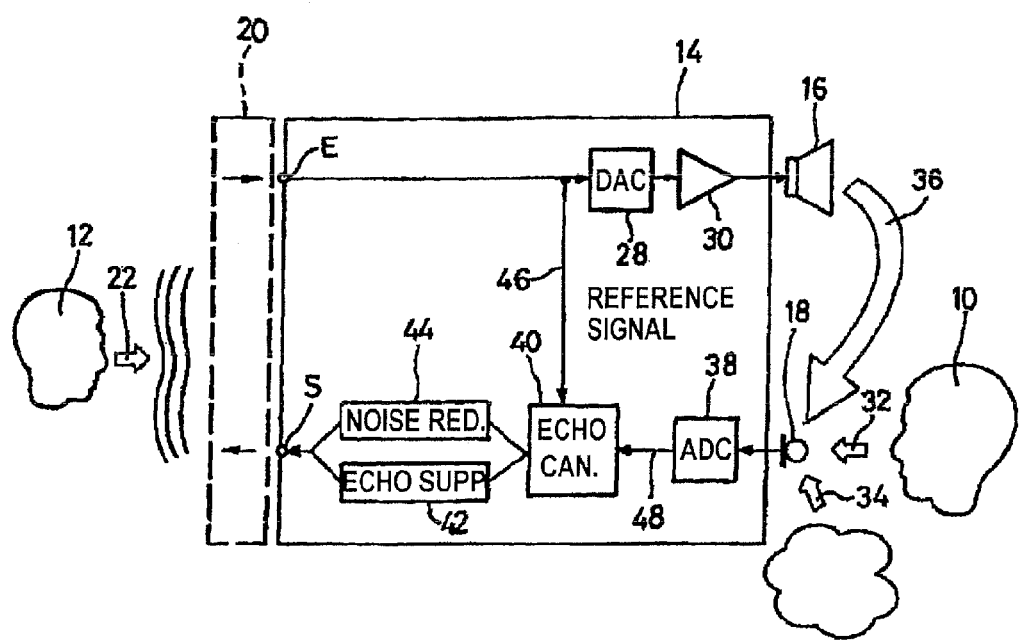
FIG_1

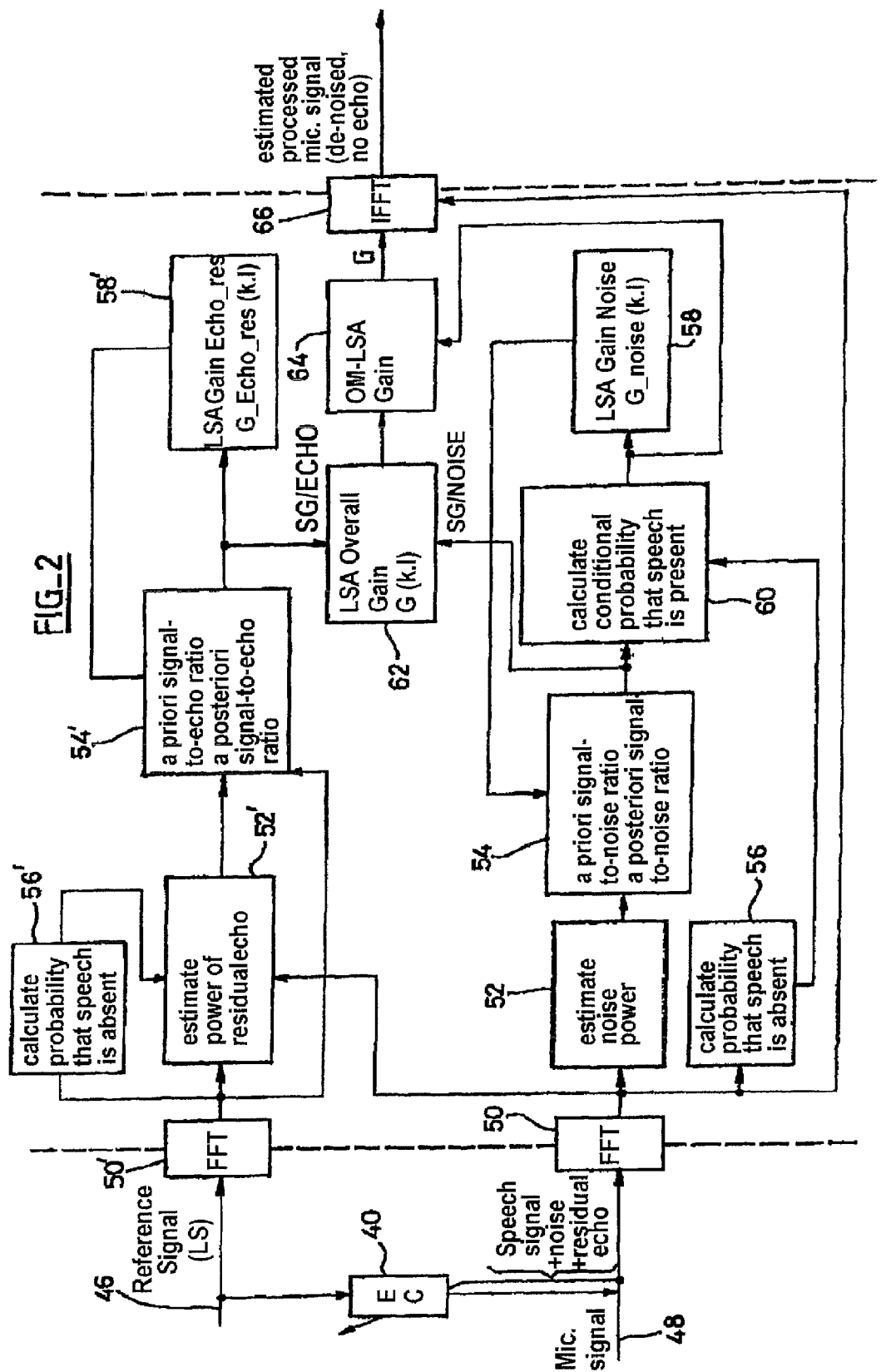
FIG_2

METHOD OF REDUCING RESIDUAL ACOUSTIC ECHO AFTER ECHO SUPPRESSION IN A "HANDS FREE" DEVICE

The invention relates in general to echo reduction in devices using audio signals picked up by a microphone, e.g. telephones, "hands-free" type adapters, and analogous devices.

In particular, the invention can advantageously be applied to a "hands-free" device suitable for use in association with a cell phone, in particular an independent "hands-free" device that can be installed removably in a motor vehicle.

More precisely, echo can result from two phenomena of different kinds. The first type of echo is known as "line echo", being restricted to the transmission path and for which various filtering methods are known; the second type of echo is known as "acoustic" echo, being the echo that is actually picked up by the microphone and that is due to the phenomenon of reverberation in the environment of the speaker, typically the room the speaker is in or the cab of a vehicle. The present invention relates most particularly to eliminating the second type of echo (acoustic echo).

Acoustic echo constitutes a major disturbance for the device, and it can often go so far as to make the speech of the near speaker (the speaker whose speech is embedded in the acoustic echo) to be incomprehensible for the remote speaker (the speaker at the other end of the telephone signal transmission channel).

These appliances include a sensitive microphone for picking up the speech of the near speaker, and a relatively powerful loudspeaker for reproducing the speech of the remote speaker while a telephone conversation is taking place. Nevertheless, because of acoustic coupling between those two transducers, the microphone picks up not only the voice of the near speaker, but also ambient noise and above all the acoustic echo, i.e. the reverberation of the sound reproduced by the loudspeaker—with the level thereof being made all the higher by the microphone and the loudspeaker being close together and with the acoustic power played back by the loudspeaker being high. This applies typically to systems on board a motor vehicle where the sound level for the loudspeaker is relatively high in order to cover ambient noise.

In addition, many such devices are made in the form of independent and removable appliances comprising in a single box both the microphone and the loudspeaker together with control buttons: the proximity of the loudspeaker and the microphone (a few centimeters) then leads to a level of acoustic echo that is considerable, typically of the order of twenty times greater than the speech signal produced by the near speaker.

In addition, in such devices, the considerable distance between the microphone and the near speaker, gives rise in the microphone signal to noise in addition to the acoustic echo, which noise has a relative level that is high, thus making it difficult to extract the useful signal embedded in the echo and the noise. Furthermore, the noise presents spectral characteristics that are not steady, i.e. they vary unpredictably as a function of driving conditions: driving over deformed roads or cobbles, car radio in operation, etc., making it even more difficult to develop algorithms suitable for processing the signal.

For these reasons, it is particularly difficult to eliminate the acoustic echo, particularly in environments that are very noisy, typical of motor vehicles, where ambient noise is further added to the speech and echo signals picked up by the microphone.

It is also important that the processing for eliminating echo does not give rise to perceptible distortion in the useful signal, and does not generate any "musical noise", or generates as little as possible, where musical noise is a strident type of noise that is particularly perceptible and disagreeable to hear.

Under such circumstances, known devices with the best performance implement: i) an echo cancellation module; ii) an echo suppression module; and iii) a noise reduction module. The echo cancellation module (or acoustic echo canceller (AEC)) performs an algorithm that models the acoustic coupling between the loudspeaker and the microphone by applying a linear transformation to the remote speaker signal (i.e. the signal for reproduction by the loudspeaker) in order to model the echo picked up by the microphone. This transformation dynamically defines an adaptive filter, which filter is applied to the incident signal coming from the remote speaker. The result of this filtering is then subtracted from the signal picked up by the microphone, thereby having the effect of cancelling the major fraction of the acoustic echo.

The echo suppression module serves to suppress the residual echo that is present after the processing by the echo cancellation module, by attenuating the residual echo down to the level of the background noise. Unlike echo cancellation, which is implemented essentially by signal subtraction, echo suppression operates by controlling gain. The drawback is that the gain reduction that is applied is also applied to the useful component of the signal picked up by the microphone (near speaker speech), since this gain is applied to the entire incident signal considered as a whole.

Finally, the noise reduction module seeks to reduce the background noise picked up by the microphone while preserving the voice of the near speaker. Such noise reduction is advantageously performed dynamically and adaptively, by identifying between periods of silence in the conversation in order to act during such periods to identify the noise and characterize its spectrum, and then by performing selective de-noising using suitably adapted attenuation.

WO-A-00/25441 describes a device implementing the various above-described modules.

Devices that have been proposed in the past nevertheless do not give complete satisfaction in double-talk configurations, in particular with appliances where the distance between the loudspeaker and the microphone is very small compared with the distance between the near speaker and the microphone, such that when the near speaker is speaking, the level of the echo that is produced is considerably higher than the mean level of the speech from the near speaker, as mentioned above.

Furthermore, the echo cancellation module, which is based on an adaptive linear filter, does not model the coupling perfectly, and takes no account of non-linearities that are introduced, in particular by the amplifier and the loudspeaker, nor does it take account of the electrical background noise from the analog-to-digital converter circuit. These various phenomena give rise to instability in the echo cancellation algorithm, which needs to re-adapt in a very short length of time.

After processing by the echo cancellation module, the residual echo can thus reach a level that is relatively high, thereby giving the module for suppressing the residual echo an arduous task to perform.

The difficulty of designing an echo cancellation module that performs well, combined with the need for residual echo reduction processing by means of a "post-processor" is mentioned in particular by C. Faller and J. Chen in *Suppressing acoustic echo in a spectral envelope space*, IEEE Transactions on Speech and Audio Processing, Vol. 13, No. 5, pp. 1048-1062, September 2005.

In order to avoid the above-mentioned difficulties, and in order to reduce the complexity of the algorithm for reducing the acoustic echo, those authors recommend an alternative to the technique of echo cancellation by means of a linear adaptive filter: instead of attempting to model the acoustic coupling, the algorithm analyzes the spectral envelope of the echo signal and applies spectral modification processing directly, taking account in particular of the frequency selectively of the human hearing system.

The technique proposed in that document nevertheless presents serious limitations for signals in which the echo level is very high and in environments that are very noisy, typical of hands-free adapters used in cars, where the techniques that implement modeling of the acoustic coupling with an adaptive linear filter are found to present considerably improved performance, with better elimination of the echo and with less distortion of the speech signal.

One of the objects of the invention is to propose an improved method of echo cancellation of the above-specified type, i.e. that is usable in combination with an adaptive filter echo cancellation module that enables the useful components of the signal to be preserved as much as possible while reducing to a greater extent the residual echo component. This should be done without introducing perceptible distortion in the useful signal and without generating interfering musical noise, or generating such noise as little as possible.

Another object of the invention is to propose an improved method of echo cancellation that can also provide background noise reduction, by distinguishing between the noise component and the residual echo component in the microphone signal so as to determine which component, given its spectrum, is the more damaging to the useful speech component, and to apply the suppression processing thereto on a priority basis.

The method of the invention is a method of the type known from above-mentioned WO-A-00/25441, i.e. comprising in the time domain echo cancellation processing operating by subtracting from the microphone signal a reference signal that is delivered by an adaptive circuit for modeling said acoustic coupling. The method further comprises, in the frequency domain and over successive frames of the signal, processing to suppress the residual echo that remains after executing the echo cancellation processing, and processing for reducing the noise present in the signal after executing the echo cancellation processing.

The treatment in the frequency domain for suppressing the residual echo comprises estimating respective values for the power of the residual echo in a plurality of defined frequency bands for successive frames of the signal, and calculating and applying a variable gain that is specific to each frequency band and each frame, the respective gain being smaller for the frequency band under consideration when the estimated relative power of the residual echo is high, and vice versa.

In characteristic manner, according to a first aspect of the invention, the processing further comprises, for each frequency band and for each frame, estimating a priori respective values for the power of the ambient noise present in the microphone signal, and comparing the relative levels of noise power and of residual echo power in the microphone signal. Said variable gain is then calculated as a function of the estimated relative power of the residual echo when the level thereof is greater than that of the noise, and otherwise as a function of the estimated relative power of the noise.

Preferably, in a second aspect of the invention, the method comprises estimating a probability for the presence/absence of speech; and using the estimated probability for the presence/absence of speech to weight the estimated relative power of the residual echo, the power value being further reduced by said weighting when the probability of speech is low, and vice versa.

In an advantageous implementation, the estimated relative power of the residual echo is given, for the frequency band k defined for the frame l, by the expression:

$$\text{Power\_Echo\_res}(k, l) = \frac{|E\{E(k, l) \cdot \overline{X}(k, l)\}|^2}{E\{|X(k, l)|^2\}} \cdot (1 - q_{ref}(k, l))$$

where:
E{•} represents mathematical expectation;
E(k,l) is the discrete Fourier transform of the microphone signal after the reference signal has been subtracted therefrom by the echo cancellation processing;
X(k,l) is the discrete Fourier transform of the reference signal used for echo cancellation processing; and
$q_{ref}(k,l)$ represents the probability of speech being present.

The variable gain may also be calculated as a function of an a posteriori estimate of the respective values of the residual echo power in the microphone signal, both when the level of the residual echo is greater than that of the noise, and when it is less than the level of the noise.

There follows a description of an implementation of the invention given with reference to the accompanying drawings.

FIG. 1 is a general diagram showing the various stages involved in processing the signal.

FIG. 2 is a more detailed diagram showing the various functional blocks involved both in the echo cancellation module and in the combined noise reduction and residual echo suppression module.

With reference to FIG. 1, there follows a description of the general structure of a "hands-free" device which, in a manner that is itself known, comprises echo cancellation means, echo reduction means, and noise reduction means.

Such a device is for conveying a telephone conversation between two people, namely a near speaker 10 and a remote speaker 12. The near speaker 10 is the speaker close to the "hands-free" device 14. The remote speaker 12 is the person with whom the near speaker is in telephone conversation.

The device 14 is typically a device installed in a motor vehicle, either permanently or removably. It possesses a loudspeaker 16 for reproducing the speech of the remote speaker, and a microphone 18 for picking up the speech of the near speaker 10. The device also includes interface means, shown diagrammatically at 20, for both-way transmission of signals over a telephone network, for example (and in non-limiting manner) a wireless interface of the Bluetooth type (trademark of Bluetooth SIG, Inc.) or of any other type enabling the device 14 to be coupled to the cell phone of the near speaker, whereby the near speaker is in radio telephone communication with the remote speaker.

The incident signal received on the input E of the device 14, which includes the speech component 22 from the remote speaker 12, is applied to a digital-to-analog converter 28 and then to the input of an audio amplifier 30 which reproduces the signal on the loudspeaker 16.

The microphone 18 picks up an acoustic signal that is a combination of: i) speech 32 from the near speaker 10; ii) ambient noise 34 that exists in the speaker's environment (e.g. in the cab of the motor vehicle); and iii) the signal 36 reproduced by the loudspeaker 16.

The signal 36 constitutes an echo signal that is undesirable from the point of the microphone 18. As mentioned above, given the operating levels of the amplifier 30, and given the large amount of coupling due to the proximity of the loudspeaker 16 and the microphone 18, when the remote speaker 12 is speaking, the level of the signal 36 can be as much as twenty times the level of the speech signal 32 from the near speaker 10.

Acoustic echo reduction is performed after the signal from the microphone 18 has been digitized via an analog-to-digital converter stage 38 by performing three successive processes: i) echo cancellation 40; ii) echo suppression 42; and iii) noise reduction 44.

These processes are implemented in the form of appropriate algorithms executed by a microcontroller or a digital signal processor incorporated in the device 14. Although for clarity of explanation, these three processes are described as being in the form of distinct modules, they make use of elements in common, and correspond in fact to a plurality of functions executed overall by the same software.

The various functional blocks of the software that process the signal both in the time domain (echo cancellation 40) and in the frequency domain (echo suppression 42 and noise reduction 44) are described in detail below with reference to FIG. 2.

The first module is the echo cancellation module 40. It has essentially no effect on the speech from the near speaker 10: the voice of the near speaker thus remains intact after echo cancellation 40. Echo cancellation consists in dynamically defining a compensation filter that receives as input a reference signal 46 coming from the remote speaker (the signal on the input E of the device) for the purpose of subtracting from the signal 48 picked up by the microphone 18 a suitably filtered version of the received signal so as to output a signal from which the parasitic echo has been removed. The linear filter may be characterized by means of an echo suppression algorithm such as an algorithm of the affine projection algorithm (APA) type, or of the least mean squares (LMS) type, or of the normalized LMS (NLMS) type.

Such an improved adaptive algorithm of the APA type is described for example in FR-A-2 792 146 (Parrot SA).

Nevertheless for various reasons (imperfect filter identification, approximate linear modeling, presence of non-linearities, . . . ) it frequently happens that the echo remains audible after processing by the echo cancellation module 40.

The purpose of the echo suppression module 42 is to suppress this residual echo by attenuating the echo signal down to the level of the background noise.

The invention relates in particular to this reduction of the residual echo, which is performed in a manner that is explained below.

Finally, the noise reduction module 44 serves to reduce the background noise 34 picked up by the microphone, while preserving the speech 32 from the near speaker.

The de-noising processing proper is performed in the frequency domain, with conversion between the time and frequency domains being performed by means of fast Fourier transforms with windowing and overlap. The de-noising implements an estimate of the noise and calculates gain for each frequency band: during periods that are identified as silences, the noise as picked up is analyzed in its various frequency components so as to determine the energy of the noisiest frequency components and subsequently apply low gain to the noisy signal while leaving intact those components that present little or no noise. The gain values are based on statistical models of speech and noise and on estimating parameters for those models.

The signal as processed in this way, with its echo removed and after being de-noised, is finally delivered to the output S of the device for transmitting to the remote speaker via the interface 20.

The invention proposes a novel technique for suppressing the residual echo, providing better performance than the techniques that have been used in the past.

Those techniques present various limitations, in particular when the echo is difficult to predict and can reach maximum levels that are very high, in particular because of the physical proximity between the microphone and the loudspeaker.

The principle on which the residual echo suppressor of the invention is based consists in using a technique that is comparable to that implemented for reducing noise. In other words, the residual echo is considered to be noise and processing is applied thereto that consists in spectral subtraction and calculating optimum gain for each of its frequency components.

Thus, for a frequency component k and a frame of index (time) l, residual echo suppression in accordance with the invention consists in calculating and applying a gain $G\_Echo\_res(k,l)$ that is:

low when the frequency components contain a large amount of residual echo; and close to unity or equal to unity when the frequency components contain little or no residual echo.

The effect of this processing is to reduce the energy of the frequency components in which the residual echo is large while leaving intact those components that do not contain any residual echo.

In order to be able to calculate the gain, it is necessary to have an estimate of the a priori and a posteriori signal-to-noise ratios, which themselves require knowledge of the power of the residual echo.

The invention proposes the method described below, with the following notations:

$y(n)$ signal picked up by the microphone (signal 48);

$e(n)$ microphone signal with the estimated echo subtracted therefrom;

$echo\_res(n)$ residual echo (after echo cancellation processing);

$s(n)$ near speaker speech signal;

$n(n)$ noise signal from the surroundings of the near speaker;

$x(n)$ reference signal (signal 46 used for echo cancellation processing);

n current sample;

h real impulse response (unknown) of the linear portion of the coupling between the loudspeaker and the microphone;

$\hat{h}$ estimated impulse response, updated using adaptive methods; and $\otimes$ represents the convolution product.

Using the above notation, the microphone signal can be expressed in the form:

$$y(n)=s(n)+\text{echo}(n)+n(n) \quad (1)$$

Ignoring the non-linear portion of the coupling, this gives the following relationship:

$$y(n)=s(n)+h \otimes x(n)+n(n) \quad (2)$$

Similarly, it is possible to express the microphone signal from which the estimated echo has been subtracted as follows:

$$e(n)=s(n)+(h-\hat{h}) \otimes x(n)+n(n) \quad (3)$$

Taking the discrete Fourier transform of expression (3) gives:

$$E(k,l)=S(k,l)+\alpha(k,l)\cdot X(k,l)+N(k,l) \quad (4)$$

where k and l represent respectively the frequency component (frequency band) and the number of the frame.

This amounts to assuming that for each frequency band k, the residual echo is proportional to the reference signal, the parameter $\alpha(k,l)$ corresponding to an attenuation. This amounts to assuming that the residual echo is equal to the reference, when attenuated by $\alpha(k,l)$.

If (4) is multiplied by $\overline{X}(k,l)$ and if we take the expectation, written $E\{\bullet\}$:

$$E\{E(k,l)\cdot\overline{X}(k,l)\}=\{S(k,l)\cdot\overline{X}(k,l)\}+E\{\alpha(k,l)\cdot X(k,l)\cdot\overline{X}(k,l)\}+E\{N(k,l)\cdot\overline{X}(k,l)\} \quad (5)$$

Assume that $\alpha(k,l)$ is independent of the frame under consideration, i.e. that $\alpha(k,l)=\alpha(k)$. Assume also that the variables $S(k,l)$ and $\overline{X}(k,l)$ the variables $N(k,l)$ and $\overline{X}(k,l)$ are decorrelated. It is also assumed that they are zero on average, which assumption is not restrictive for speech signals or noise signals. This results in simplified expression (6):

$$E\{E(k,l)\cdot\overline{X}(k,l)\}=\alpha(k)\cdot E\{|X(k,l)|^2\}. \quad (6)$$

It is now possible to define an estimate of the power of the residual echo. This is written:

$$Esp\_EX(k,l)=E\{E(k,l)\cdot\overline{X}(k,l)\}$$

$Esp\_EX(k,l)$ is obtained by smoothing the preceding frame:

$$Esp\_EX(k,l)=(1-\lambda)\cdot Esp\_EX(k,l-1)+\lambda\cdot\overline{X}(k,l)\cdot E(k,l)$$

where $\lambda$ is the smoothing factor. This gives:

$$\alpha(k,l) = \frac{Esp\_EX(k,l)}{E\{|X(k,l)|^2\}}.$$

Since $Echo\_res(k,l)=\alpha(k,l)\cdot X(k,l)$:

$$Power\_Echo\_res(k,l)=E\{\alpha(k,l)^2\cdot X(k,l)\cdot\overline{X}(k,l)\}$$

$$Power\_Echo\_res(k,l)=E\{\alpha(k,l)^2|X(k,l)|^2\}$$

Whence:

$$Power\_Echo\_res(k,l) = \frac{|E\{E(k,l)\cdot\overline{X}(k,l)\}|^2}{E\{|X(k,l)|^2\}}. \quad (7)$$

The presence of background noise in the reference signal X (due to the ambient noise picked up beside the remote speaker and to the noise introduced by the transmission path) leads to a residual echo being estimated even when the remote speaker is not speaking, since the expectation in the numerator cannot be exactly zero. Nevertheless, the effective residual echo introduced by such background noise from the remote speaker end is not objectionable.

Since the process of suppressing the residual echo by the proposed method gives rise to a small amount of voice distortion, it is preferable not to overestimate the residual echo when that is not necessary. That is why, in practice, it is desirable to weight expression (7) by the probability that speech is present, which is the same as (1−the probability that speech is absent). The expression then becomes:

$$Power\_Echo\_res(k,l) = \frac{|E\{E(k,l)\cdot\overline{X}(k,l)\}|^2}{E\{|X(k,l)|^2\}}\cdot(1-q_{ref}(k,l)) \quad (8)$$

where $q_{ref}(k,l)$ represents the probability of speech being present in the reference signal for frequency k and frame l.

This produces an estimate of the power of the residual echo, which is then used when calculating the a priori and a posteriori signal-to-echo ratios.

In another aspect, the invention proposes calculating an overall gain rather than calculating two gains separately after processing by the echo cancellation module (one for suppressing the residual echo, which function is performed by the module 42, and the other for reducing noise, which function is performed by the module 44).

For a frequency band k and a frame l, this overall gain, written $G(k,l)$, takes account both of the presence of noise and of the presence of residual echo.

FIG. 2 shows the various functions implemented for calculating this gain $G(k,l)$.

The basic principle of this processing relies on the work described by:

[1] Y. Ephraim and D. Malah, *Speech enhancement using a minimum mean-square error short-time spectral amplitude estimator*, IEEE Transactions on Acoustics, Speech, and Signal Processing, Vol. ASSP-32, No. 6, pp. 1109-1121, December 1984; and

[2] Y. Ephraim and D. Malah, *Speech enhancement using a minimum mean-square error-log spectral amplitude estimator*, IEEE Transactions on Acoustics, Speech, and Signal Processing, Vol. ASSP-3, No. 2, pp. 443-445, April 1985.

As mentioned above, the invention proposes using those techniques, that were initially designed for de-noising, for the purpose of suppressing the residual echo after echo cancelling.

Essentially, the signal containing the residual echo is analyzed as independent frequency components by a discrete Fourier transform. A respective optimum gain is calculated for and applied to each of these components and then the signal as processed in this way is recombined in the time domain. In [1], the applied gain is referred to as short-time spectral amplitude (STSA) gain and it serves to minimize the mean square distance between the estimated signal (at the output from the algorithm) and the original (non-noisy) speech signal. In [2], applying a gain referred to as log-spectral amplitude (LSA) gain serves to minimize the mean square distance between the logarithm of the amplitude of the estimated signal and the logarithm of the amplitude of the original speech signal. This second criterion is found to be better than the first, since the chosen distance provides a better match with the behavior of the human ear and thus gives results that are qualitatively better.

Whatever the circumstances, the essential idea is to reduce the energy of frequency components that have a large amount of interference by applying small gain thereto, while leaving intact components that have little or no interference, by applying gain equal to 1 thereto.

Implementing this processing makes it possible to calculate a value $G(k,l)$ for the LSA gain. An algorithm of the optimally-modified log-spectral amplitude (OM-LSA) type enables this calculation of the LSA gain for application to be improved by weighting it by the conditional probability of speech being present, using a technique described in particular in:

[3] I. Cohen, *Optimum speech enhancement under signal presence uncertainty using log-spectral amplitude estimator*, IEEE Signal Processing Letters, Vol. 9, No. 4, April 2002.

More precisely, and as shown in FIG. 2, the processing is performed firstly on the basis of the signal 48 picked up by the microphone after echo cancellation by the module 40 (acoustic echo canceller, AEC), and secondly on the basis of the reference signal 46 representative of the signal reproduced by the loudspeaker.

These two signals 46 and 48 are transferred into the frequency domain by a fast Fourier transform (FFT) (blocks 50, 50').

For de-noising, the signal is subjected to processing of the kind described in references [1] and [2], with noise power in the various frequency bands being estimated for a given signal frame (block 52) and with an a priori signal-to-noise ratio being determined (block 54). This signal also makes it possible to calculate a probability of speech being absent (block 56). Processing by an LSA algorithm (block 58) serves, by looping, to obtain an a posteriori signal-to-noise ratio (block 54) after weighting by the conditional probability of speech being present (block 60). Thus, for each frequency component (frequency band) k of each frame of index l, there are obtained an a priori signal-to-noise ratio value and an a posteriori signal-to-noise ratio value. For more details about these echo reduction algorithms, reference may be made to above-mentioned references [1] and [2]. Above-mentioned reference [3] explains how to weight the gain by the conditional probability of speech being present.

If the a priori signal-to-noise ratio and the a posteriori signal-to-noise ratio are written respectively SNR_prio(k,l) and SNR_post(k,l), then reference [3] gives, the following expression for the gain G_noise(k,l), as a function of parameters $$\xi(k, l) = \text{SNR\_prio}(k, l)$$

and $$\gamma(k, l) = \text{SNR\_post}(k, l)$$

$$G\_noise(k, l) = G\_noise(\xi(k, l), \gamma(k, l))$$
$$= \frac{\xi(k, l)}{\xi(k, l) + 1} \exp\frac{1}{2} \int_{v(k,l)}^{+\infty} \frac{e^{-t}}{t} dt$$

with $v(k, l) = \frac{\xi(k, l)}{\xi(k, l) + 1} \cdot \gamma(k, l)$

The invention proposes using processing similar to that described above for calculating a ratio, not of signal-to-noise but of signal-to-echo (here and below, the term "echo" is used for simplification purposes to designate the residual echo which it is desired to minimize).

The a priori signal-to-echo ratio and the a posteriori signal-to-echo ratio are written respectively SER_prio(k,l) and SER_post(k,l). These ratios are calculated by functional blocks 52', 54', 56', and 58' in FIG. 2, which execute algorithms similar to those of the corresponding blocks 52, 54, 56, and 58 described above in the context of processing noise. This calculation is performed on the basis of data produced by applying a fast Fourier transform (FFT) 50' to the reference signal 46.

The values for the a priori signal-to-echo ratio and the a posteriori signal-to-echo ratio and for the a priori signal-to-noise ratio and the a posteriori signal-to-noise ratio are thus known, and they are applied together to the LSA gain calculation algorithm (block 62).

The OM-LSA gain is calculated by the block 64. At its output, an inverse Fourier transform (block 66) reproduces the microphone signal after it has been de-noised and without echo.

In order to calculate the overall gain G (k,l), i.e. the gain that takes account both of echo and of noise, the invention proposes using above expression (9) given for calculating noise, but selecting parameters $\xi(k,l)$ and $\gamma(k,l)$ that depend both on the signal-to-noise ratios and on the signal-to-echo ratios.

Instead of using the parameters $\xi(k,l)$ and $\gamma(k,l)$, it is possible in particular to use the parameters $\xi'(k,l)$ and $\gamma'(k,l)$ such that:

$$\xi'(k,l) = \min(\text{SER\_prio}(k,l), \text{SNR\_prio}(k,l)) \quad (10)$$

$$\gamma'(k,l) = \text{SER\_post}(k,l) \quad (11)$$

If the residual echo is greater than the noise, then the signal-to-echo ratio will be smaller than the signal-to-noise ratio: it is therefore the parameter SER_prio(k,l) that is selected in order to apply a gain that serves mostly for reducing echo. In this situation, the echo masks the noise and it is desirable to bring the echo down to the level of the noise.

Conversely, if the noise is greater than the residual echo, the signal-to-noise ratio is smaller than the signal-to-echo ratio, and the parameter SNR_prio(k,l) is selected for applying a gain that serves mainly to reduce noise.

In other words, by taking the minimum of SER_prio(k,l) and of SNR_prio(k,l), the most favorable circumstance is always selected since it is always desirable to reduce the most damaging interfering component.

The same reasoning could be applied to the parameter $\gamma(k,l)$ by taking the minimum of the a posteriori signal-to-noise and signal-to-echo ratios. However, in practice, it is found that using the a posteriori signal-to-echo ratios under all circumstances gives rise to less musical noise in the played-back signal.

The gain value is thus obtained that takes account both of echo and of noise as follows:

$$G(k, l) = G(\xi'(k, l), \gamma'(k, l)) \quad (11)$$
$$= \frac{\xi'(k, l)}{\xi'(k, l) + 1} \exp\left\{\frac{1}{2} \int_{v'(k,l)}^{-\infty} \frac{e^{-t}}{t} dt\right\}$$

with $v'(k, l) = \frac{\xi'(k, l)}{\xi(k', l) + 1} \cdot \gamma(k', l)$

The invention claimed is:

1. A method of processing an audio signal picked up by the microphone (18) of a "hands-free" device (14) also including a loudspeaker (16) liable to introduce an interfering acoustic echo by acoustic coupling with the microphone, the signal picked up by the microphone comprising a useful speech component (32), an interfering acoustic echo component (36), and an interfering ambient noise component (34), the method comprising in the time domain: echo cancellation processing device (40) operating by subtracting from the picked-up signal a reference signal delivered by an adaptive circuit for modeling said acoustic coupling, the method further comprising, in the frequency domain and on successive frames of the signal:

processing within echo suppression module (42) to suppress the residual echo that remains after performing the echo cancellation processing, and comprising:

estimating respective values for the power of the residual echo over a plurality of frequency bands defined for successive frames of the signal; and calculating and applying a variable gain specific to each frequency band and each frame, the respective gains being smaller whenever the frequency band in question presents high estimated relative power for the residual echo, and vice versa; and processing within noise reduction module (44) for reducing the noise present in the signal after execution of the echo cancellation processing, the method being characterized: in that it further comprises, for each frequency band and for each frame: estimating a priori respective values for the power of the ambient noise present in the microphone signal; and comparing relative levels of noise power and of residual echo power in the microphone signal; and in that said variable gain is calculated as a function of the estimated relative power of the residual echo when the level thereof is greater than that of the noise, and otherwise as a function of the estimated relative power of the noise, wherein the estimated relative power of the residual echo is given, for the frequency band k defined for the frame l, by the expression:

$$\text{Power\_Echo\_res}(k, l) = \frac{|E\{E(k, l) \cdot \overline{X}(k, l)\}|^2}{E\{|X(k, l)|^2\}} \cdot (1 - q_{ref}(k, l))$$

where:

$E\{\bullet\}$ represents mathematical expectation;

$E(k,l)$ is the discrete Fourier transform of the microphone signal after the reference signal has been subtracted therefrom by the echo cancellation processing;

$X(k,l)$ is the discrete Fourier transform of the reference signal used for echo cancellation processing; and $1-q_{ref}(k,l)$ represents the probability of speech being present.

2. The method of claim 1, further comprising:

estimating a probability for the presence/absence of speech; and using the estimated probability for the presence/absence of speech to weight the estimated relative power of the residual echo, the power value being further reduced by said weighting when the probability of speech is low, and vice versa.

3. The method of claim 1, wherein said variable gain is also calculated as a function of an a posteriori estimate of respective values for the residual echo power in the microphone signal.

4. The method of claim 3, wherein said variable gain is calculated as a function of the a posteriori estimate of respective values for the residual echo power in the microphone signal, both when the level of the residual echo is greater than the level of the noise, and when it is less than the level of the noise.

* * * * *